(12) United States Patent
Baumann et al.

(10) Patent No.: US 9,356,552 B1
(45) Date of Patent: May 31, 2016

(54) MOTOR DRIVE SYSTEM DATA INTERFACE SYSTEM AND METHOD

(71) Applicant: ROCKWELL AUTOMATION TECHNOLOGIES, INC., Mayfield Heights, OH (US)

(72) Inventors: Kevin Louis Baumann, Cedarburg, WI (US); Paul Thomas Krause, Fredonia, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 14/613,961

(22) Filed: Feb. 4, 2015

(51) Int. Cl.
*G06F 17/00* (2006.01)
*H02P 31/00* (2006.01)

(52) U.S. Cl.
CPC ...................................... *H02P 31/00* (2013.01)

(58) Field of Classification Search
CPC .............. G06F 17/00; G06F 17/30395; G06F 17/30398; G06F 17/30401; G06F 17/30507; G06F 17/30522

USPC .......................................................... 235/375
See application file for complete search history.

(56) References Cited

U.S. PATENT DOCUMENTS

| 8,768,565 B2* | 7/2014 | Jefferies | G07B 15/00 701/29.6 |
| 8,805,411 B2* | 8/2014 | Furuta | H04W 24/00 455/456.1 |
| 2014/0195101 A1* | 7/2014 | Chen | G06F 17/30522 701/29.6 |
| 2014/0266639 A1* | 9/2014 | Zises | G08C 17/02 340/12.28 |

* cited by examiner

*Primary Examiner* — Seung Lee
(74) *Attorney, Agent, or Firm* — Fletcher Yoder P.C.

(57) ABSTRACT

A motor drive system includes a motor drive processor, a motor drive memory component, a server, and a display that displays a machine readable code, wherein the motor drive forms a secure wireless connection with a smart device once the smart device has scanned the machine readable code.

20 Claims, 5 Drawing Sheets

MOTOR DRIVE SYSTEM DATA INTERFACE SYSTEM AND METHOD

BACKGROUND

The subject matter disclosed herein relates generally to motor drive systems used in industrial automation applications, and more specifically to systems and methods for establishing a secure wireless connection between a drive and a smart device.

Electric motors are employed in a variety of applications, such as a great variety of automation operations, manufacturing applications, material packaging and handling, metal forming, paper handling, textiles, and so forth. In a typical arrangement, a motor drive sends signals to the electric motor to control operation of the electric motor. human interface modules (HIMs; also sometimes called human machine interfaces or HMIs), such as those available from Rockwell Automation of Milwaukee, Wis., or other operator interfaces may be used to provide a user with access to such automation devices. HIMs and other operator interface devices have become more expensive to produce as more and more cutting-edge features are incorporated into the design. The increasing prevalence of smart devices (e.g., smart phones, tablet computers, etc.) offer an alternative human interface, but wireless connections between smart devices and automation components may not be sufficiently secure for some applications, and such security concerns has limited their adoption in the industrial automation context.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a motor drive system includes a motor drive processor, a motor drive memory component, a server, and a display that displays a machine readable code, wherein the motor drive forms a secure wireless connection with a smart device once the smart device has scanned the machine readable code.

In a second embodiment, a method of accessing data related to a motor drive system includes displaying a machine readable code, scanning the machine readable code via a smart device, receiving confirmation that the smart device scanned the machine readable code, receiving confirmation that a user submitted valid login information, and establishing a secure connection with the smart device.

In a third embodiment, a method of accessing data related to a motor drive system includes actuating a discover mode in the smart device, scanning, via the smart device, a machine readable code displayed by the motor drive, sending confirmation that the smart device scanned the machine readable code to the motor drive, prompting a user to input user login information, confirming that the user's login information is valid, and establishing a secure connection with the motor drive.

DRAWINGS

These and other features, aspects, and advantages of the present invention will become better understood when the following detailed description is read with reference to the accompanying drawings in which like characters represent like parts throughout the drawings, wherein.

Figure 1:
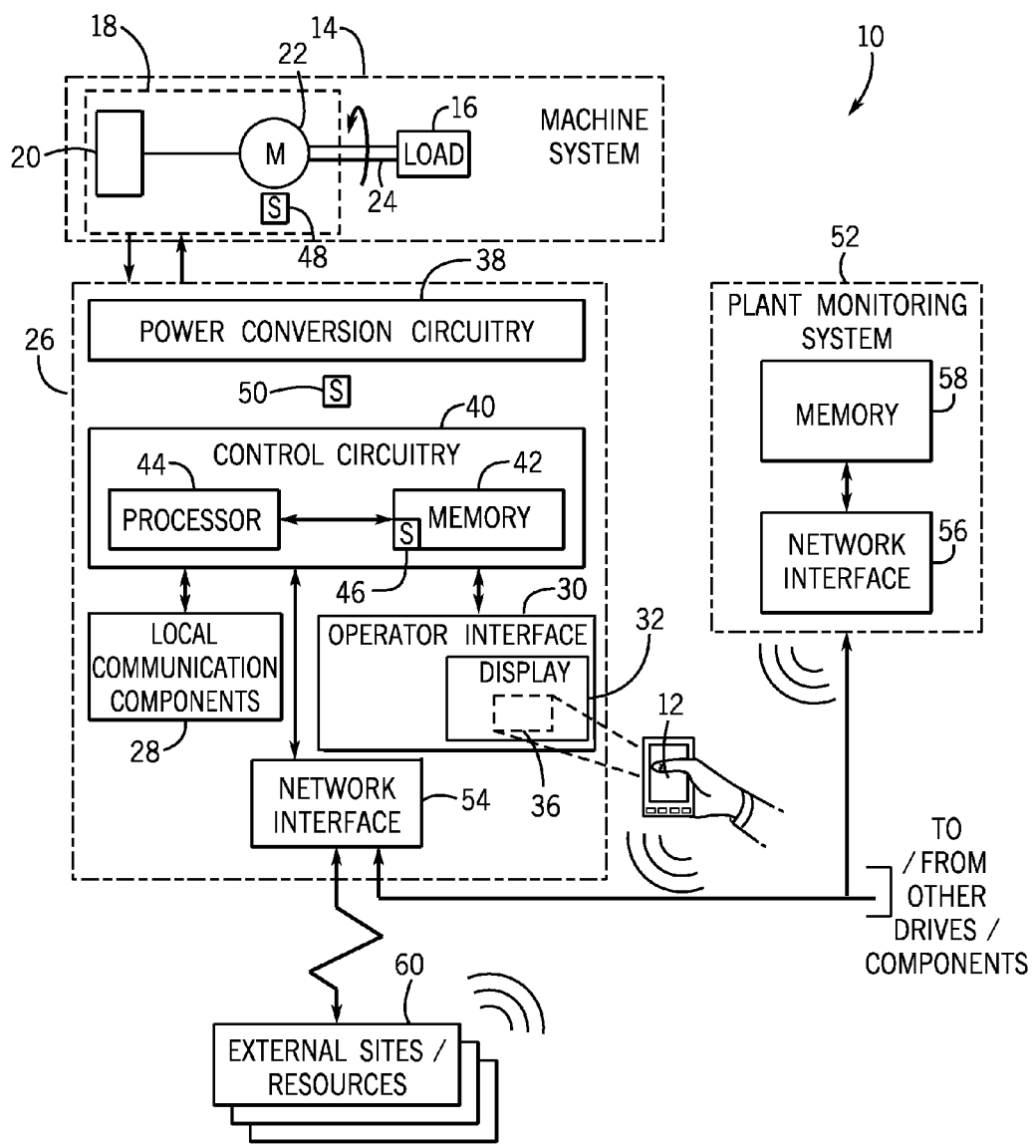
FIG. 1 is a schematic of one embodiment of a motor drive system in accordance with aspects of the present disclosure.
Figure 2:
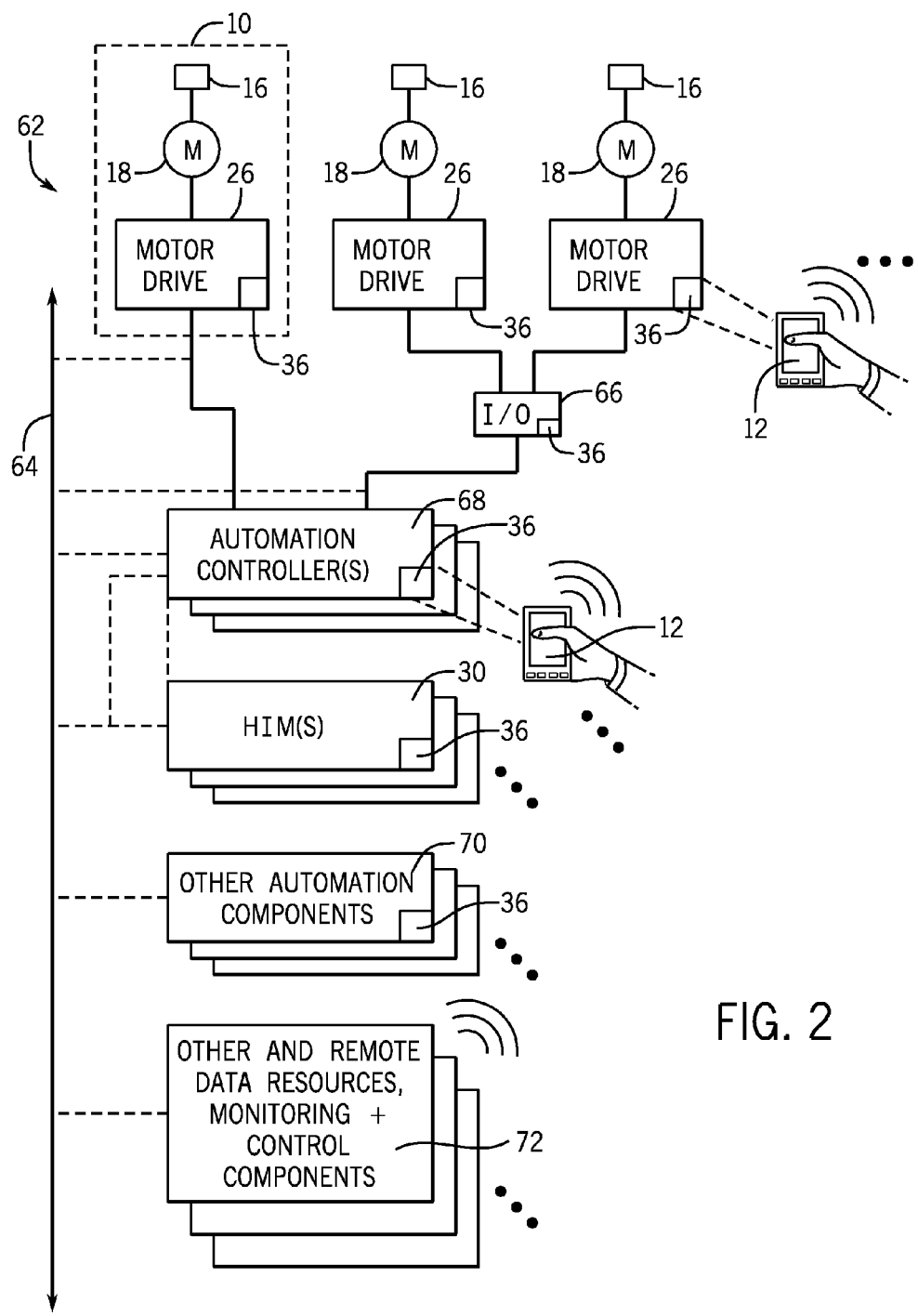
FIG. 2 is a schematic of one embodiment of an automation application, including the motor drive system of FIG. 1, in accordance with aspects of the present disclosure.
Figure 3:
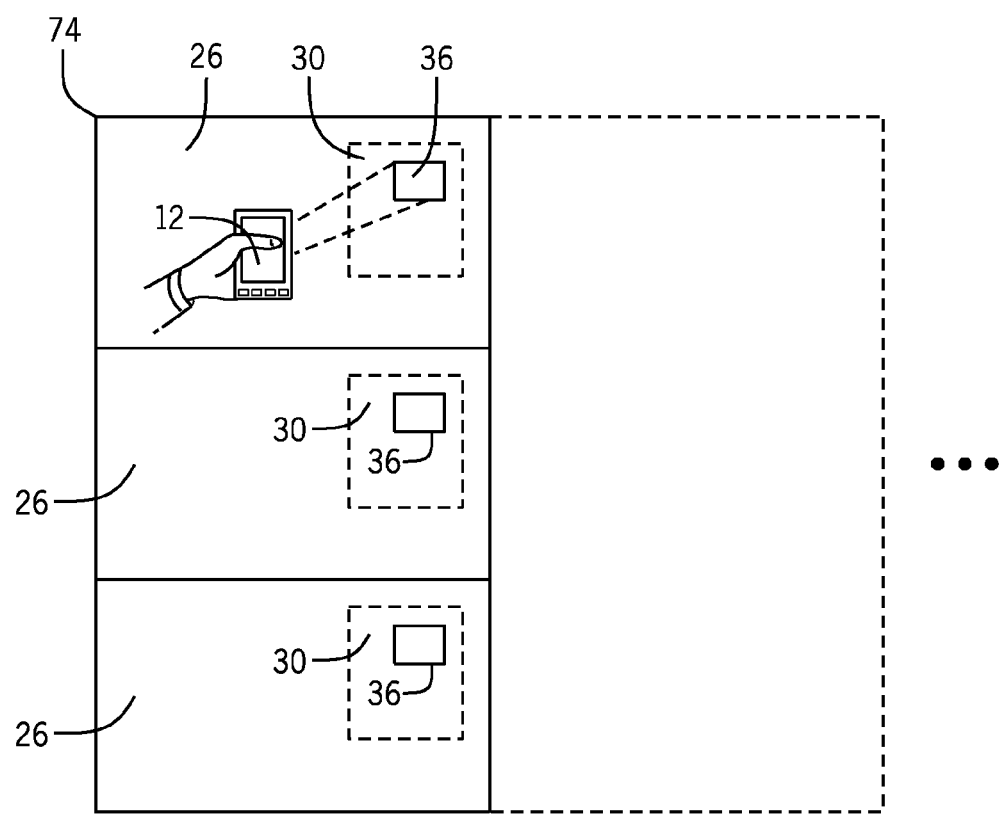
FIG. 3 is a schematic of one embodiment of a bank of motor drives, as may appear in the automation application of FIG. 2, in accordance with aspects of the present disclosure.
Figure 5:
Figure 6:
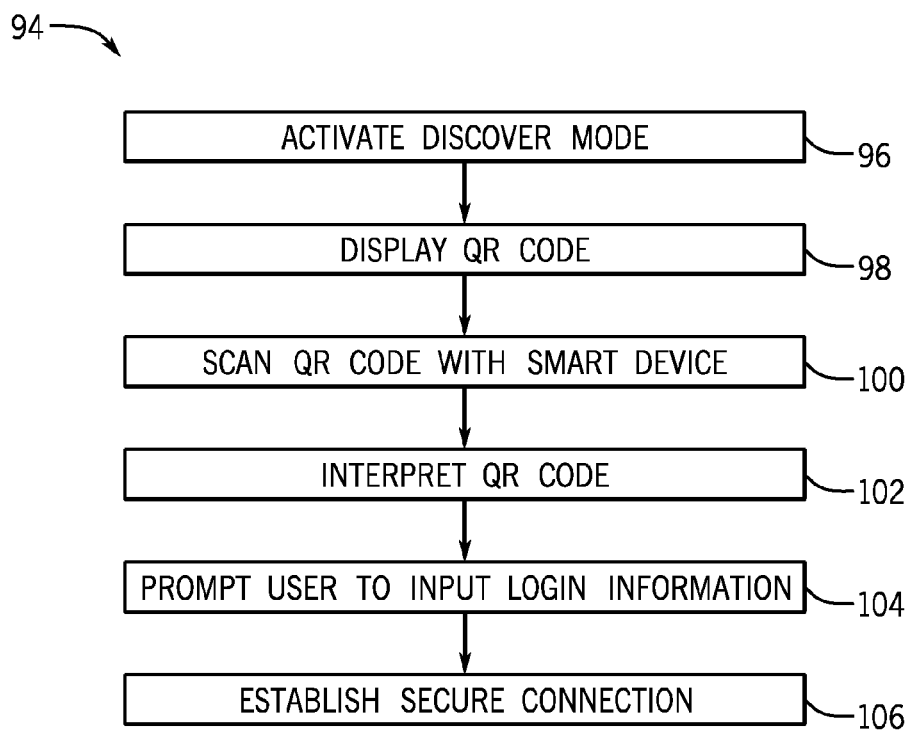

FIG. 5 shown one embodiment of the dynamic barcode shown in FIGS. 1-3, in accordance with aspects of the present disclosure; and FIG. 6 is a flowchart illustrating a process for securely connecting a smart device to a motor drive in accordance with aspects of the present disclosure.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

When motor drive systems are used in industrial and other applications, a HIM or other operator interface may be used to provide a user with access to the drive, as well as to other automation equipment. Access to the drive may be desired for accessing the maintenance or service history of the motor drive system, setting or adjusting operating parameters of the motor drive system, accessing user manuals, receiving push notifications, accessing product configuration data, receiving operational notifications, allowing at least some degree of control of the drive, copying, replacing, transferring, or configuring the drive, checking operational parameters and diagnostics, and so forth.

Though types of wireless data transmission such as Wi-Fi, Bluetooth, ZigBee, ANT, and IR data transmission have become commonplace in daily life, wireless data transmission has not truly penetrated many industrial automation applications because of access and security concerns. By developing a secure connection between a smart device and a motor drive system, the smart device could be used as the primary (or secondary) user interface, such that the HIM requires only minimal features and can thus be produced at a low cost. Even where conventional (or later developed) HIMs are utilized the smart device may offer advantages of mobility, portability, individual configurability, and multi-function operation, to mention only a few.

Turning now to the figures, FIG. 1 illustrates an exemplary embodiment of a motor drive system 10 capable of displaying one or more machine readable codes, and configured to enable a secure connection with a smart device 12. The motor drive system 10 may be part of a machine system 14 that comprises one or more components to produce rotational energy for a load 16, typically an electric motor 18. Although the motor drive system 10 is illustrated as a rotational system, the techniques of the present disclosure may be applied to a variety of motion systems, such as linear motors, other actuators, and so forth. The load 16 may be any device that can utilize the rotational energy produced by the machine system 14, such as a fan, turbine, a compressor, pump, conveyor drive, to mention only a few. It should be borne in mind that any of a vast number of driven loads may be coupled to the motor and motor drive. Indeed, in many applications, many such motors and drives may be coupled in a plant, factory, machine system or process, and these may be interconnected via networks for coordination of their operation, and for communicating with more centralized monitoring and control systems.

The motor 18, which may be any suitable motor, such as an induction motor, may include an encoder 20, and a rotor/stator system 22 having a shaft 24, which is coupled to the load 16. The motor 18 rotates the shaft 24, thereby driving the load 16 into rotation. The motor 18 is powered and controlled by the motor drive system 10, which itself comprises a motor drive 26. That is, the motor drive 26 provides signals to the motor 18 to drive the motor in operation and in many cases to adjust a speed of the motor 18. The encoder 20, monitors an angular position or angular velocity of the shaft 24. When provided, the encoder 20 sends a signal to the motor drive 26 that is indicative of the position and/or velocity of the shaft 24. Subsequently, the motor drive 26 may adjust the signals output to the motor 18 (e.g., the frequency of the drive signals), thereby controlling its speed, based on the signal from the encoder 20. It should be noted that many different types, sized, ratings and control regimes may be accommodated in the present context. For example, drives 26 may implement speed and/or torque control, follow desired starting or stopping control characteristics, and so forth. In general, the motor drives 26 used will include control circuitry that determines the parameters of the signals to be applied to the motor 18, and drive circuitry responsive to the control circuitry that powers power electronic switches (such as insulated gate bipolar transistors, or IGBTs) that convert DC power from a power bus internal to the drive 26 to controlled frequency output signals that drive the motor in operation. Similarly, although an encoder 20 is illustrated, some systems may base control on computations of position, speed, acceleration, and so forth without the need for an encoder 20.

In some embodiments, the motor drive 26 includes local communication components 28 configured to communicate wirelessly with a smart device 12 or computer. Local communication components 28 may include any components necessary for communicating with the smart device 12 via Wi-Fi, Bluetooth, ZigBee, ANT, IR data transmission, or some other form of near-field/wireless communication. The local communication components 28 may be a single component (e.g., a Blutetooth chip), or multiple components (i.e, a collection of components that enable some form of near-field/wireless communication). Furthermore, local communication components 28 may include components capable of different types of near-field/wireless communication. For example, a smart device 12 may be equipped with both Wi-Fi and Bluetooth components.

The motor drive 26 may also include HIM 30, or other operator interface with a display 32 capable of displaying machine readable codes (e.g., static barcodes 34, dynamic barcodes 36 of any suitable type, such as QR codes, or other machine readable codes) or human readable codes. The HIM 30 enables operator interaction with the motor drive 26. The HIM 30 may be of any suitable type, such as one available from Rockwell Automation of Milwaukee, Wis., or a similar device that allows a user access to the motor drive system 10 or other automation components. Such devices may be integrated with the motor drive 26, or provided as separate devices. In operation, they may provide for accessing operational data, error codes, configuration and programming data, and so forth either directly or indirectly from the motor drive. For example, the operator may adjust a speed set point for the motor 18 or acknowledge an operational issue with the motor drive 26. Current operator interfaces may include input devices such as a touch screen, keypad, stylus, pushbuttons, dial, etc. However, when connected to the motor drive 26, the smart device 12 may supplement or replace the operator interface as the primary or secondary user interface. For example, in one embodiment, the HIM 30 may only be used to display machine readable codes, while the other tasks previously performed using the HIM 30 are performed using the smart device 12. Such a configuration reduces the functionality required of the HIM 30. For example, in some embodiments, the HIM 30 may only need a very simple screen or display. In other embodiments the HIM 30 comprise a touch device (such as a physical or virtual button) to put the motor drive 26 in discover mode. By limiting the functionality of the HIM 30 and relying instead on the capabilities of the smart device 12, the manufacturer of the HIM 30 could possibly reduce the cost of the operator interface.

In the present context, a smart device 12 may scan and decode the machine readable code displayed by or sent from the HIM 30. In a presently contemplated embodiment, the smart device 12 may be a phone, tablet, reader, wearable, or other smart device equipped with a camera or scanner to scan and decode machine readable code displayed on the HIM. The smart device 12 may be carried throughout the industrial facility in which the motor drive system 10 is installed, thereby enabling the operator to efficiently connect to the motor drive system 10. In practice, any of a variety of readers and systems may be employed for this purpose. This may include general purpose devices with appropriate applications or routines installed on them, or special purpose or dedicated readers designed for data collection and so forth. Where desired, a reader may be coupled to a laptop or other mobile computing device to allow for accessing data (e.g., web pages and so forth) when an operator is near the motor or motor drive 26.

In one embodiment, to establish a secure connection between the motor drive 26 and the smart device 12, the user puts the smart device 12 into a discover mode. The user may or may not be required to put the motor drive 26 in discover mode through the HIM 30. When the motor drive 26 detects a smart device 12 in discover mode, the motor drive 26 will display a machine readable code on the display 32 of the HIM 30 that is unique to the motor drive 26. In the present embodiment, the machine readable code comprises a dynamic bar code 36, such as a QR code. However, in other embodiments, the machine readable code may also be a static barcode or some other machine readable code. With improvements in technology, the machine readable code could also allow for human reading. The user uses the camera or scanning function of the smart device 12 to capture or scan the dynamic bar code 36. In other embodiments, the smart device 12 may have a scanner in addition to or in place of a camera. Upon recognition of the dynamic bar code 36, the user will be prompted to input login information, which may include a username or user ID and a password. The user may be prompted to enter his or her login information by the web browser or by an application on the smart device 12. Once the user's login information is confirmed, a secure connection will be established between the motor drive 26 and the smart device 12. The user may then perform functions or tasks previously performed using the operator interface 30, as well as some functions not possible using the operator interface 30. These functions may include accessing the maintenance or service history of the motor drive system 10, setting or adjusting operating parameters of the motor drive system, accessing user manuals, receiving push notifications, accessing product configuration data, receiving safety notifications, limited control, copying, replacing, transferring, or configuring the drive, utilizing the GPS and/or altimeter functions of the smart device 12 to perform diagnostics, etc.

It should be noted that allowing the user to scan the dynamic bar code 36 with a smart device removes ambiguity as to which motor drive 26 the user wants to connect to when there are multiple motor drives 26 in a particular area or range. That is, the user is sure that the particular motor drive of interest is that component from which the data was captured. Additionally, requiring the user to scan the dynamic bar code 36 displayed on the HIM 30 necessitates that the user have physical access to the motor drive 26, adding another level of security. Without requiring the user to scan the dynamic bar code 36 displayed on the motor drive's HIM 30, an unauthorized user could otherwise connect to a motor drive in a less secure manner.

In certain embodiments, once connected to the motor drive 26, the user may use an application or internet browser on the smart device 12 to connect to a site (e.g., an internal site or an external website) containing nameplate information, configuration information, operational and service history, any desired general information on the equipment, or specific information regarding troubleshooting or motor or drive performance and operation. Accordingly, the secure connection enables an operator to quickly look up maintenance information for the rotor/stator system 22, the encoder 20, the motor drive 26, or any combination thereof. In certain implementations, the user can access timestamps for which the corresponding equipment was most recently serviced. Such information may be stored on the motor, the motor drive, or any other component, database, computer system, automation controller, or the like that is connected to and available in the automation system. Such devices may be interconnected to a network for the exchange of control and/or monitoring data. The smart device may be required to be part of or to log onto such networks to access the desired data, and in some implementations, access may be granted by virtue of the authentication process already noted.

As shown, the motor drive 26 is used to detect and control the speed of the motor 18. In a presently contemplated embodiment, the motor drive 26 also includes features to enable efficient troubleshooting of the motor drive system 10. As shown, the motor drive 26 includes, power conversion circuitry 38, and control circuitry 40. The power conversion circuitry 38 conditions current from a power source into a suitable form for the motor 18. In particular, the power conversion circuitry 38 may include rectifiers, inverters, switches (e.g., insulated gate bipolar transistors, or IGBTs), and the like. For example, the power conversion circuitry 38 may convert power between alternating current (AC) and direct current (DC), then to controlled frequency AC output power, or may control the parameters of the output power supplied to the motor 18.

The control circuitry 40 controls the speed of the motor 18 by controlling switches (e.g., IGBTs) within the power conversion circuitry 38, thereby adjusting the power supplied to the motor 18. As shown, the control circuitry 40 includes a memory 42 and processor 44 to store and execute instructions to control the speed (and torque, etc.) of the motor 18 and to troubleshoot the motor drive system 10. The memory 42 may also include a server 46, allowing the exchange of machine readable codes, login information, user manuals, service history, etc. These instructions may be encoded in software programs that may be executed by the processor 44. Further, the instructions may be stored in a tangible, non-transitory, computer-readable medium, such as the memory 42. The memory 42 may include, for example, random-access memory, read-only memory, rewritable memory, hard drives, and the like.

In a presently contemplated embodiment, the control circuitry 40 monitors the overall operation of the motor drive system 10. As shown, sensors 48 and 50 are communicatively coupled to the control circuitry 40. The sensors 48 and 50 detect various operating conditions of the machine system 14 and the motor drive 26, respectively. The type of detected operating conditions may vary widely among embodiments, and may include voltages, currents, speeds, temperatures, pressures, liquid levels, and the like. For example, the sensor 48 may detect current and voltage supplied to the motor 18.

For example, the control circuitry 40 may detect an anomaly in the output signals provided to the motor 18. A push notification and/or troubleshooting instructions may then be sent to the connected smart device 12. In certain embodiments, the web browser of the smart device 12 may direct the user to a site, or an application on the smart device may display troubleshooting instructions. As will be appreciated, the site or application may be internal or external to the organization in which the motor drive system 10 is installed. For example, the site or application may link to a third-party user manual with troubleshooting information. Additionally or alternatively, the site or application may provide dynamic (e.g., near-real time) or historical information (e.g., from a plant monitoring system 52) regarding operation of the motor drive 26.

As shown, the control circuitry 40 is communicatively coupled to the plant monitoring system 52 (e.g., distributed control system) via network interfaces 54 and 56. The plant monitoring system 52 includes memory 58 (e.g., a database) that is communicatively coupled to the machine system 14. The memory 58 stores historical operating data for the motor drive 26 and the motor 18. In certain embodiments, the plant monitoring system 52 may receive historical operating data from additional components, such as additional motor drive systems and the like.

In order to resolve troubleshooting issues, it may be desirable to examine historical operating data to identify trends. Accordingly, the troubleshooting instructions accessed by the smart device 12 may include a database query. The smart device 12 may retrieve historical operating data from the memory 58 of the plant monitoring system 52. The database query may retrieve a variety of operating data for the motor 18 and the motor drive 26, such as currents, voltages, speeds, flow rates, temperatures, pressures, and the like. The smart device 12 may display the historical operating data (e.g., as a chart) alongside the troubleshooting instructions in order to facilitate a speedy resolution of the operating issue. That is, the troubleshooting instructions may be retrieved from a variety of sources (e.g., from a site, from an application, and/or from a database query). Accordingly, the smart device 12 may be communicatively coupled to both the external resources 60 (e.g., the Internet) and the plant monitoring system 52, but may selectively receive troubleshooting information from either.

In certain embodiments, troubleshooting instructions may be stored in various memory components of the motor drive system 10. For example, the memory 42 of the control circuitry 40 may store data relating to operational issues and their associated troubleshooting instructions (e.g., an error code library). When an operational issue is detected, the control circuitry 40 determines the appropriate error code. Thus, it may be desirable to maintain an up-to-date error code library within the memory 42 to ensure appropriate troubleshooting instructions. To this end, the memory 42 is communicatively coupled to one or more external resources 60 through the network interface 54. The memory 42 may periodically update its error code library by downloading later versions from the one or more external resources 60. As will be appreciated, the memory 42 and other components of the motor drive 26 may communicate using wired communications, wireless communications, and the like.

FIG. 2 illustrates an automation application 62 with a number of automation components that a user may access using a smart device 12, including the motor drive system 10 shown in FIG. 1. The automation application 62 includes a number of motor drive systems 10, which may be connected to a network 64. Multiple motor drive systems 10 may also be connected to an input/output device 66 capable of displaying a machine readable code that can be read using a smart device 12. The automation application 62 may also include one or more automation controllers 68, one or more HIMs 30, other automation components 70, and one or more remote data resources or monitoring and control components 72.

As shown in FIG. 1, each motor drive 26 has a HIM 30, or other operator interface, with a display 32 capable of displaying a dynamic barcode 36. Each motor drive system 10 may be connected to a network 64. The server 46 in each motor drive 26 allows the motor drive 26 to receive dynamic barcodes 36, user login credentials, error codes, safety warnings, user manuals, maintenance/service history, and the like from other devices connected to the network 64. Multiple motor drive systems 10 may also be connected to an input/output device 66, which may also be capable of displaying machine readable codes readable by a smart device 12 in order to establish a secure connection.

The automation application may include one or more automation controllers 68 connected to the motor drive systems 10, either directly or through an input/output device 66. The automation controller 68 may also be connected to the network 64. The one or more automation controllers 68 may control the function of one or more motor drive systems 10 in an automation application 62. In one embodiment, the automation controller 68 is capable of displaying a dynamic barcode 36 that may be read by a smart device 12 to establish a secure connection between the automation controller 68 and the smart device 12. The secure connection may allow the user to access certain information related to the automation controller itself, or the one or more motor drive systems 10 under the control of the automation controller.

The automation application 62 may include one or more HIMs 30 or other user interfaces connected to the network 64. In some automation applications 62, each motor drive 26 may have its own HIM 30 that stays attached to that specific motor drive 26. In other automation applications 62, the HIM 30 may be disconnected from one motor drive 26 and plugged into another motor drive 26 or automation component. This allows an automation application 62 to operate with fewer HIMs 30 than there are motor drives 26 or automation components. In some embodiments, the automation application 62 may have a single HIM 30 that is used to access all of the automation components. Each HIM 30 includes a display 32 capable of displaying a dynamic barcode 36 that a smart device 12 may scan in order to establish a secure connection to the HIM 30. By connecting to the HIM 30, the smart device 12 may have access to the HIM 30 itself or one or more of the automation components the HIM 30 may have access to.

The automation application 62 may also include a number of other automation components 70, which may or may not be connected to network 64. In some embodiments, the other automation components 70 will be capable of displaying a dynamic barcode 36, read by a smart device 12 in order to establish a secure connection between the component 70 and the smart device 12. The network 64 may be connected to a number of remote data resources, as well as monitoring and control components 72. These components 72 may control the entire automation application 62, sub-systems, or individual components of the automation application 62 from a remote location. The components 72 may also monitor the functions of the automation application 62, and collect data from the automation application 62, which the user may access with a smart device 12 once a secure connection has been established.

FIG. 3 illustrates a bank of motor drives 74, as may appear in the automation application 62 from FIG. 2. In some automation applications, the motor drives 26 of multiple motor drive systems 10 may be oriented such that they are physically stacked in a bank 74 to provide easier access for a user. As shown in FIGS. 1 and 2, each motor drive 26 includes a HIM 30 or other operator interface, which is capable of displaying a dynamic barcode 36. The user scans the dynamic barcode 36 with a smart device 12 as a part of the process for establishing a secure connection between a smart device 12 and a motor drive 26. Each dynamic barcode 36 will be unique to a given motor drive so there is no ambiguity as to which motor drive 26 the user would like to connect the smart device 12.

Figure 4:
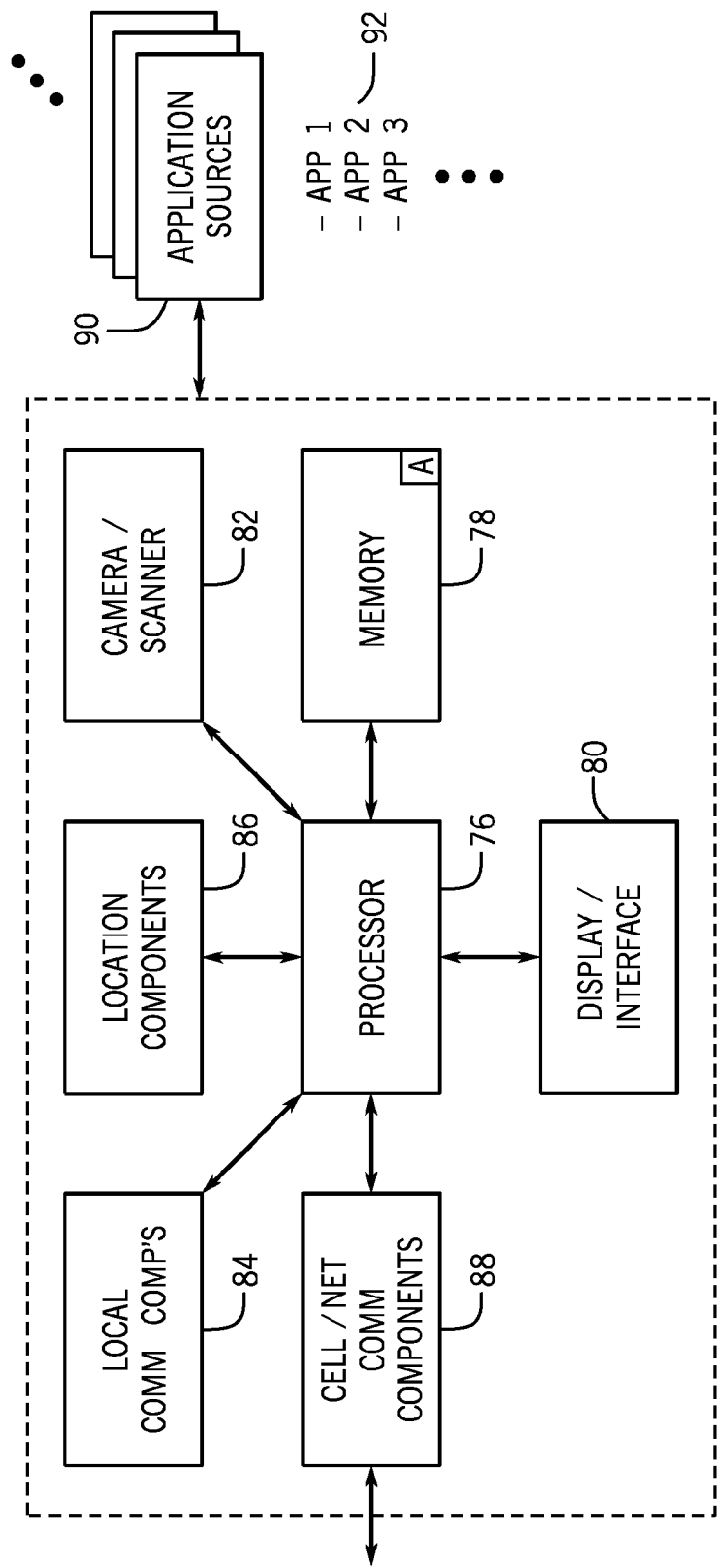
FIG. 4 is a schematic of one embodiment of the smart device shown in FIGS. 1-3, in accordance with aspects of the present disclosure.

FIG. 4 is a schematic of one embodiment of the smart device 12 shown in FIGS. 1-3. The smart device 12 may include a processor 76, memory 78, a display/interface 80, a camera/scanner 82, local communication components 84, location components 86, and cellular/network communication components 88. The smart device 12 may also have access to one or more application sources 90 over a network, from which the smart device 12 can download one or more applications 92.

The processor 76 and memory 78 on smart device 12 may store and execute instructions, programs, or applications, among other things. The memory 78 may be for example, random-access memory, read-only memory, rewritable memory, hard drives, and the like. The display/interface 80 allow the smart device 12 and the user to communicate with one another. In some embodiments, the display/interface 80 includes a screen and some way for the user to input data or commands. These capabilities may be combined, for example a touch screen, or kept separate, for example a screen and pad with stylus, a keyboard, a mouse pad, or a series of buttons. The smart device 12 also includes a camera or scanner 82 used for reading dynamic barcode 36 in the process of establishing a secure connection between the motor drive 26 and the smart device 12.

Local communication components 84 include any components necessary for communicating with the local communication components 28 within the motor drive 26 via Wi-Fi, Bluetooth, ZigBee, ANT, IR data transmission, or some other form of near-field/wireless communication. The local communication components 84 may be a single component (e.g., a Blutetooth chip), or multiple components (i.e, a collection of components that enable some form of near-field/wireless communication). Furthermore, local communication components 84 may include components capable of different types of near-field/wireless communication. For example, a smart device 12 may be equipped with both Wi-Fi and Bluetooth components 84.

The location components 86 determine characteristics about the location of the smart device 12 or its environment. Examples of location components include a GPS component, an altimeter, a compass, barometer, thermometer, and the like. Once connected to a motor drive system 10 or other automation component, the location components 86 in the smart device 12 may assist in performing diagnostics based upon the geographic location, the altitude, temperature, weather, or other operating conditions of the automation component. The cellular/network communication components 88 allow the smart device to communicate over a cellular network, wireless network, or wired network. The cellular/network communication components 88 allow the user to use applications or sites that allow access to the motor drive 26 or other automation components. Additionally, through the cellular/network communication components 88, the smart device 12 may communicate with one or more application sources 90 in order to download one or more applications 92 that allow access to the automation components.

FIG. 5 is an example of the dynamic barcode 36 that may be displayed on the HIM 30 shown in FIGS. 1-3 in the form of a QR code. It should be understood, however that dynamic barcode 36 need not be a QR code and may be any dynamic barcode, or some other machine readable code.

FIG. 6 illustrates a process for securely connecting a smart device 12 to a motor drive 26 or other automation component. In block 96, the user puts the smart device 12 into a discover mode. When the smart device 12 is in discover mode, the local communication components 84 will search for a device sending out a Bluetooth (or other near-field/wireless communication) signal. Block 96 may also include activating the Bluetooth or other communication components 28 on the motor drive 26. For example, the motor drive 26 may have a button the user presses in order to make the motor drive 26 or other automation component send out a signal to be discovered by the smart device 12.

In block 98, once the smart device 12 senses the motor drive 26, rather than going through a traditional Bluetooth handshake, the motor drive displays a dynamic barcode 36 or other machine readable code. In block 100, the user uses the camera/scanner 82 of the smart device 12 to scan or take a picture of the dynamic barcode 36. In block 102, the smart device 12, interprets the dynamic barcode 36 and, through an application 92 or web browser, communicates with the external sites/resources 60 to confirm the dynamic barcode 36. Once the dynamic barcode 36 is confirmed, in block 104, the user will be prompted to input his or her login information, which may include a user ID and password. If the user login information is correct, in block 106, the external sites/resources 60 will allow a secure connection between the motor drive 26 and the smart device 12.

When a user attempts to establish a connection between a smart device 12 and a motor drive 26 or other automation component using a smart device 12 that has previously connected to the motor drive 26 or automation component, the process of connecting 94 will be the same except that the user may not be prompted to input their login information (block 104), effectively omitting block 104 because the login information is remembered. Put another way, when a user returns with a smart device 12 that had been previously connected to the drive, once the dynamic barcode 36 has been scanned and confirmed, the user need not input their login information in order to establish a secure connection between the smart device 12 and the motor drive 26.

Once connected the user will have access to the motor drive 26 or other industrial automation component. From within the smart device's 12 application 92 or web browser, the user may obtain the maintenance or service history of the motor drive system 10, set or adjust operating parameters of the motor drive system, access user manuals, receive push notifications, access product configuration data, receive safety notifications, exercise limited control, copy, replace, transfer, or configure the drive, utilize the GPS and/or altimeter function of the smart device 12 to perform diagnostics, etc.

Technical effects of the invention include an automation system includes a motor drive, which includes a motor drive processor, a motor drive memory component, a server, and a display that displays a machine readable code, wherein the motor drive forms a secure wireless connection with a smart device once the smart device has scanned the machine readable code.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A motor drive system comprising:
   a motor drive processor configured to execute instructions;
   a motor drive memory component in communication with the motor drive processor, wherein the motor drive memory component is configured to store data;
   a server in communication with the motor drive memory component, wherein the server is configured to enable exchange of data between the motor drive system and a device connected via a network; and
   a display configured to display a machine readable code, wherein the motor drive is configured to form a secure wireless connection with a smart device once the smart device has scanned the machine readable code and login credentials have been entered.

2. The motor drive system of claim 1, wherein the smart device comprises a cellular phone, a tablet, or a reader.

3. The motor drive system of claim 1, wherein the machine readable code comprises a QR code.

4. The motor drive system of claim 1, wherein the machine readable code comprises a barcode.

5. The motor drive system of claim 1, wherein the machine readable code comprises a dynamic barcode.

6. The motor drive system of claim 1 wherein, the smart device is configured to communicate with the motor drive via WiFi, Bluetooth, ZigBee, ANT, IR, or near field communication.

7. The motor drive system of claim 1 wherein, the smart device includes location components configured to determine the location or altitude of the motor drive for diagnostic purposes.

8. The motor drive system of claim 1, further comprising local communication components.

9. A method of accessing data relating to a motor drive system comprising:
- displaying, via a display of the motor drive system, a machine readable code for a smart device to scan;
- receiving from an external site or resource, via a network interface of the motor drive system, confirmation that the smart device scanned the machine readable code;
- receiving from the external site or resource, via the network interface of the motor drive system, confirmation that a user submitted valid login information; and
- establishing, via the motor drive system, a secure connection between the motor drive system and the smart device.

10. The method of claim 9, wherein the machine readable code comprises a QR code.

11. The method of claim 9, wherein the machine readable code comprises a barcode.

12. The method of claim 11, wherein the machine readable code comprises a dynamic barcode.

13. The method of claim 9, wherein the smart device comprises a cellular phone, a tablet, or a reader.

14. The method of claim 9, wherein the secure connection comprises via WiFi, Bluetooth, ZigBee, ANT, IR, or near field communication.

15. The method of claim 9, further comprising reconnecting to a known device by:
- displaying, via the display of the motor drive system, a second machine readable code for a smart device to scan;
- receiving from the external site or resource, via the network interface of the motor drive system, confirmation that the smart device scanned the second machine readable code;
- reestablishing, via the motor drive system, a secure connection with the smart device without requiring the user to reenter login information.

16. A method of accessing data relating to a motor drive system comprising:
- actuating, via a local communication component of a smart device, a discover mode in the smart device;
- scanning, via a camera or scanner of the smart device, a machine readable code displayed by the motor drive system;
- sending, via a network communication component of the smart device, confirmation that the smart device scanned the machine readable code of the motor drive;
- prompting, via an interface of the smart device, a user to input user login information;
- confirming, via the network communication component of the smart device, that the user login information is valid; and
- establishing, via the local communication component of the smart device, a secure connection between the smart device and the motor drive system.

17. The method of claim 16, wherein the machine readable code comprises a QR code.

18. The method of claim 16, wherein the machine readable code comprises a dynamic barcode.

19. The method of claim 16, wherein the secure connection comprises a WiFi, Bluetooth, ZigBee, ANT, IR, or near field communication connection.

20. The method of claim 16, further comprising reconnecting to a known device by:
- actuating, via the local communication component of the smart device, the discover mode in the smart device;
- scanning, via the camera or scanner of the smart device, a second machine readable code displayed by the motor drive;
- sending, via the network communication component of the smart device, confirmation that the smart device scanned the machine readable code of the motor drive; and
- reestablishing, via the local communication component of the smart device, the secure connection with the motor drive without requiring the user to input the user login information.

* * * * *